US006777366B2

(12) United States Patent
Gauthier et al.

(10) Patent No.: US 6,777,366 B2
(45) Date of Patent: Aug. 17, 2004

(54) METHOD FOR THE PREPARATION OF METALLOCENE CATALYSTS

(75) Inventors: William John Gauthier, Houston, TX (US); Margarito Lopez, Pasadena, TX (US); David John Rauscher, Angleton, TX (US); Don Gordon Campbell, Jr., Webster, TX (US); Margaret Elaine Kerr, Worcester, MA (US)

(73) Assignee: Fina Technology, Inc., Houston, TX (US)

(*) Notice: Subject to any disclaimer, the term of this patent is extended or adjusted under 35 U.S.C. 154(b) by 403 days.

(21) Appl. No.: 09/782,752

(22) Filed: Feb. 13, 2001

(65) Prior Publication Data

US 2002/0137624 A1 Sep. 26, 2002

(51) Int. Cl.[7] .......................... B01J 31/00; B01J 37/00; C08F 4/02; C08F 4/60
(52) U.S. Cl. ....................................... 502/117
(58) Field of Search .......................... 502/117

(56) References Cited

U.S. PATENT DOCUMENTS

| | | |
|---|---|---|
| 4,701,432 A | 10/1987 | Welborn, Jr. |
| 4,808,561 A | 2/1989 | Welborn, Jr. |
| 5,238,892 A | 8/1993 | Chang |
| 5,281,679 A | 1/1994 | Jejelowo et al. |
| 5,308,811 A | 5/1994 | Suga et al. |
| 5,324,800 A | 6/1994 | Welborn, Jr. et al. |
| 5,399,636 A | 3/1995 | Alt et al. |
| 5,444,134 A | 8/1995 | Matsumoto |
| 5,466,649 A | 11/1995 | Jejelowo |
| 5,719,241 A | 2/1998 | Razavi et al. |
| 5,789,502 A | 8/1998 | Shamshoum et al. |
| 5,807,800 A | 9/1998 | Shamshoum et al. |
| 5,968,864 A * | 10/1999 | Shamshoum et al. ....... 502/104 |
| 6,136,743 A * | 10/2000 | Sugimura et al. .......... 502/113 |
| 6,166,153 A * | 12/2000 | Shamshoum et al. ......... 526/64 |
| 6,239,058 B1 * | 5/2001 | Shamshoum et al. ....... 502/110 |
| 6,410,673 B1 * | 6/2002 | Arai et al. .................. 526/347 |
| 6,432,860 B1 * | 8/2002 | Shamshoum et al. ....... 502/103 |

FOREIGN PATENT DOCUMENTS

| | | |
|---|---|---|
| EP | 0798315 | 10/1997 |
| EP | 819706 | 1/1998 |
| EP | 0819706 | 1/1998 |
| EP | 0856525 | 8/1998 |
| EP | 0870779 | 10/1998 |
| EP | 0924226 | 6/1999 |
| WO | 9634020 | 10/1996 |

* cited by examiner

Primary Examiner—Mark L. Bell
Assistant Examiner—Jennine Brown
(74) Attorney, Agent, or Firm—William D. Jackson

(57) ABSTRACT

Process of preparing silica-supported catalysts. A support material comprising silica particles impregnated with an alumoxane co-catalyst with at least one-half of the co-catalyst disposed within the internal pore volume of the silica is contacted with a dispersion of a metallocene catalyst in an aromatic solvent. The dispersion and support are mixed at a temperature of about 10° C. or less to enable the metallocene to become reactively supported on and impregnated within the alumoxane-impregnated silica particles. The supported catalyst is recovered from the aromatic solvent and washed with an aromatic hydrocarbon and then a paraffinic hydrocarbon at a temperature of about 10° C. or less. The washed catalyst is dispersed in a viscous mineral oil.

31 Claims, 5 Drawing Sheets

METHOD FOR THE PREPARATION OF METALLOCENE CATALYSTS

FIELD OF THE INVENTION

This invention relates to supported stereorigid metallocene catalyst systems useful in the polymerization of ethylenically unsaturated compounds and, more particularly, to processes for the preparation of supported metallocene catalysts incorporating large pore silica supports.

BACKGROUND OF THE INVENTION

Numerous catalyst systems for use in the polymerization of ethylenically unsaturated monomers are based upon metallocenes. Metallocenes can be characterized generally as coordination compounds incorporating one or more cyclopentadienyl (Cp) groups (which may be substituted or unsubstituted) coordinated with a transition metal through $\pi$ bonding. When certain metallocene compounds are combined with an activator or cocatalyst such as methylaluminoxane (MAO) and optionally an alkylation/scavenging agent such as trialkylaluminum compound, highly active polymerization catalysts are formed. Various types of metallocenes are known in the art. As disclosed, for example, in U.S. Pat. No. 5,324,800 to Welborn et al, they include monocyclic (a single cyclopentadienyl group), bicyclic (two cyclopentadienyl groups, as shown in Formula 1), or tricyclic (three cyclopentadienyl groups) coordinated with a central transition metal. Homogeneous or non-supported metallocene catalysts are known for their high catalytic activity especially in olefin polymerizations. Under polymerization conditions where polymer is formed as solid particles, these homogeneous (soluble) catalysts form deposits of polymer on reactor walls and stirrers. These deposits should be removed frequently as they prevent an efficient heat-exchange, necessary for cooling the rector contents, and cause excessive wear of the moving parts. In addition, solid particles formed by such homogeneous catalysts possess undesirable particle morphologies with low bulk densities which make them difficult to circulate in the reactor, limiting throughput and they are difficult to convey outside of the reactor. In order to resolve these difficulties several supported metallocene compounds have been proposed. As disclosed in Welborn et al, typical supports include inorganic oxides such as silica, alumina or polymeric materials such as polyethylene.

Metallocene compounds, whether supported or unsupported, can further be characterized in terms of stereoregular catalysts which result in polymerization of alpha olefins, such as propylene, to produce crystalline stereoregular polymers, the most common of which are isotactic polypropylene and syndiotactic polypropylene. In general, stereospecific metallocene catalysts possess at least one chiral center and the ligand structure (usually cyclopentadienyl-based) are conformationally restricted. Due to the fluxional nature of Cp-type ligands, it is common for at least one of the Cp ligands to be suitably substituted to impart some measure of stereorigidity. Such stereospecific metallocenes can include un-bridged bicycle compounds of the general formula bicyclic coordination compounds of the general formula:

$$(Cp)_2MeQn \quad (1)$$

which are characterized by the isospecific metallocenes as described below and dicyclopentadienyl compounds of the general formula:

$$CpCp'MeQn \quad (2)$$

characterized by the syndiospecific metallocenes described below. In the aforementioned formulas, Me denotes a transition metal element and Cp and Cp' each denote a cyclopentadienyl group which can be either substituted or unsubstituted wit hCp' being different from Cp, Q is an alkyl or other hydrocarbyl or a halogen group and n is a number within the range of 1–3. In such instances stereorigidity can be provided through substituent groups which result in steric hindrance between the two cyclopentadienyl moieties, as described, for example in U.S. Pat. No. 5,243,002 to Razavi. Alternatively, the cyclopentadienyl groups are in a conformationally restricted relationship provided by a bridged structure between the metallocene rings (not shown in Formulas (1) and (2) above). It is sometimes advantageous to utilize metallocene compounds in which the two cyclopentadienyl moieties (same or different) are covalently linked by a so-called bridging group such as a dimethylsilylene group. The bridging group restricts rotation of the two cyclopentadienyl moieties and in many instances improves catalyst performance. Metallocenes containing such a bridging group are often referred to as stereorigid. While bridged metallocenes normally incorporate two cyclopentadienyl groups (or substituted cyclopentadienyl groups), bridged metallocenes incorporating a single cyclopetadienyl group which is bridged to a heteroatom aromatic group (both being coordinated with a transition metal) are also known in the art. For example, U.S. Pat. No. 5,026,798 to Canich discloses dimethylsilyl-bridged cyclopentadienyl-anilino or other heteroatom ligand structures with coordination to the transition metal being provided through the nitrogen atom of the anilino group as well as the cyclopentadienyl-group. Other common bridging groups include $CR_1R_2$, $CR_1R_2CR_2R_3$, $SiR_1R_2SiR_1R_2$ where the $R_i$ substituents can be independently selected from H or a $C_1$–$C_{20}$ hydrocarbyl radical. Alternate bridging groups can also contain nitrogen, phosphorus, boron or aluminum.

As noted previously, isospecific and syndiospecific metallocene catalysts are useful in the polymerization of sterospecific propagation of monomers. Sterospecific structural relationships of syndiotacticity and isotacticity may be involved in the formation of stereoregular polymers from various monomers. Sterospecific propagation may be applied in the polymerization of ethylenically unsaturated monomers such as $C_3$ to $C_{20}$ alpha olefins which can be linear, branched or cyclic, 1-dienes such as 1,3-butadiene, substituted vinyl compounds such as vinyl aromatics, e.g., styrene, vinyl chloride, vinyl ethers such as alkyl vinyl ethers, e.g., isobutyl vinyl ether, or even aryl vinyl ethers. Stereospecific polymer propagation is probably of most significance in the production or polypropylene or isotactic or syndiotactic structure.

The structure of isotatic polypropylene can be described as one having the methyl groups attached to the tertiary carbon atoms of successive monomeric units falling on the same side of a hypothetical plane through the main chain of the polymer, e.g., the methyl groups are all above or below the plane. Using the Fischer projection formula, the stereochemical sequence of isotatic polypropylene can be described as follows:

(3)

In Formula 3 each vertical segment indicates a methyl group on the same side of the polymer backbone. In the case of isotatic polypropylene the majority of inserted propylene units possess the same relative configuration in relation to its neighboring propylene unit. Another way of describing the structure is through the use of NMR. Bovey's NMR nomenclature for an isotatic sequence as shown above is . . . mmmm . . . with each "m" representing a "meso" dyad in which there is a mirror plane of symmetry between two adjacent monomer units, or successive pairs of methyl groups on the same said of the plane of the polymer chain. As is known in the art, any deviation or inversion in the structure of the chain lowers the degree of isotacticity and subsequently the crystallinity of the polymer.

In contrast to the isotatic structure, syndiotactic propylene polymers are those in which the methyl groups attached to the tertiary carbon atoms of successive monomeric units in the chain lie on alternate sides of the plane of the polymer. In the case of syndiotactic polypropylene, the majority of inserted propylene units have opposite relative configuration relative to its neighboring monomer unit. Syndiotactic polypropylene using the Fisher projection formula can be indicated by racemic dyads with the syndiotactic rrr shown as follows:

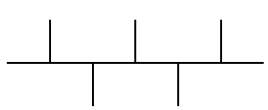

(4)

Bovey's NMR nomenclature for a syndiotactic sequence as shown above is . . . rrr . . . with each "r" representing a "racemic" dyad in which successive pairs of methyl groups are on the opposite sides of the plane of the polymer chain. Similarly, any deviation or inversion in the structure of the chain lowers the degree of syndiotacticity and subsequently the crystallinity of the polymer. The vertical segments in the preceding example indicate methyl groups in the case of syndiotactic or isotactic polypropylene. Other terminal groups, e.g. ethyl, in the case of poly1-butene, chloride in the case of polyvinyl chloride, or phenyl groups in the case of polystyrene and so on can be equally described in this fashion as either isotatic or syndiotactic.

Polypropylene resins can also be obtained in which the propylene units are inserted in a more or less random configuration. Such materials are referred to as atactic and as such, these polymers lack any signs of crystallinity as determined by common methods of X-ray diffraction (XRD), heat of fusion by Differential Scanning Calorimetry, or density. Such atactic polymers also tend to be more soluble in hydrocarbon solvents than polymers which possess some crystallinity. Syndiotactic polymers with sufficiently high levels of syndiotacticity and isotactic polymers with sufficiently high levels of isotacticity are semicrystalline. Similarly this can be established by any technique known to those skilled in the art such as XRD, DSC or density measurements. It is common for polymers to be obtained as a mixture of highly stereoregular polymer and atactic polymer. In such instances, it is often useful to perform solubility testing, such as the mass fraction soluble in xylene or boiling heptane for instance to establish the amount of atactic polymer present. In most instances, atactic polymers are more soluble than the stereoregular counterparts and therefore the mass fraction soluble in hydrocarbons provides an indirect indication of the amount of atactic polymer present. While various other stereoregular or quasi-stereoregular polymer structures, such as hemiisotactic or stereoisoblock structures, are known, the principal stereoregular polymer configurations of interest are predominantly isotactic and predominantly syndiotactic polymers.

Catalysts that produce isotactic polyolefins are disclosed in U.S. Pat. Nos. 4,794,096 and 4,975,403. These patents disclose chiral, stereorigid metallocene catalysts that polymerize olefins to form isotactic polymers and are especially useful in the polymerization of highly isotactic polypropylene. As disclosed, for example, in the aforementioned U.S. Pat. No. 4,794,096, stereorigidity in a metallocene ligand is imparted by means of a structural bridge extending between cyclopentadienyl groups. Specifically disclosed in this patent are stereoregular hafnium metallocenes which may be characterized by the following formula:

$$R''(C_5(R')_4)_2HfQp \qquad (5)$$

In Formula (5), $(C_5(R')_4)$ is a cyclopentadienyl or substituted cyclopentadienyl group, R' is independently hydrogen or a hydrocarbyl radical having 1–20 carbon atoms, and R" is a structural bridge extending between the cyclopentadienyl rings. Q is a halogen or a hydrocarbon radical, such as an alkyl, aryl, alkenyl, alkylaryl, or arylalkyl, having 1–20 carbon atoms and p is 2.

Catalysts that produce syndiotactic polypropylene or other syndiotactic polyolefins and methods for the preparation of such catalysts are disclosed in U.S. Pat. Nos. 4,892,851 to Ewen et al and U.S. Pat. No. 5,807,800 to Shamshoum et al. These catalysts are also bridged stereorigid metallocene catalysts, but, in this case, the catalysts have a structural bridge extending between chemically dissimilar cyclopentadienyl groups and may be characterized by the formula:

$$R''(CpR_n)(CpR'_m)MEQ_k \qquad (6)$$

In Formula (6), Cp represents a cyclopentadienyl or substituted cyclopentadienyl ring, and R and R' represent hydrocarbyl radicals having 1–20 carbon atoms. R" is a structural bridge between the rings imparting stereorigidity to the catalyst. Me represents a transition metal, and Q a hydrocarbyl radical or halogen. $R'_m$ is selected so that $(CpR'_m)$ is a sterically different substituted cyclopentadienyl ring than $(CpR_n)$. In Formula (6) n varies from 0–4 (0 designating no hydrocarbyl groups, i.e., no further substitution other than the bridging substituent on the cyclopentadienyl ring), m varies from 1–4, and k is from 0–3. The sterically different cyclopentadienyl rings produce a predominantly syndiotactic polymer rather than an isotactic polymer.

Like their isospecific counterparts, the syndiospecific metallocenes are used in combination with co-catalysts. One particularly useful class of co-catalysts are based on organoaluminum compounds which may take the form of an alumoxane, such as methylalumoxane or a modified alkylaluminoxane compound. Alumoxane (also referred to as aluminoxane) is an oligomeric or polymeric aluminum oxy compound containing chains of alternating aluminum and oxygen atoms, whereby the aluminum carries a substituent preferably an alkyl group. The exact structure of aluminoxane is not known, but is generally believed to be represented by the following general formula —(Al(R)—O—)$_m$ for a cyclic alumoxane, and $R_2Al$—O—(Al(R)—O)$_m$—$AlR_2$ for a linear compound, wherein R independently each occurrence is a $C_1$–$C_{10}$ hydrocarbyl, preferably alkyl, or halide and m is an integer ranging from 1 to 50, preferably at least about 4. Alumoxanes are typically the reaction products of water and an aluminum alkyl, which in addition to an alkyl group may contain halide or alkoxide groups. Reacting several different aluminum alkyl compounds, such as, for example, trimethylaluminum and tri-isobutyl aluminum, with water yields so-called modified or mixed alumoxanes.

Preferred alumoxanes are methylalumoxane and methylalumoxane modified with minor amounts of other higher alkyl groups such as isobutyl. Alumoxanes generally contain minor to substantial amounts of starting aluminum alkyl compound(s). Other cocatalysts include trialkyl aluminum, such as triethylaluminum (TEAL) or triisobutylaluminum (TIBAL) or mixtures thereof. Specifically disclosed in the '851 patent is methylalumoxane and triethylaluminum (TEAL).

Bridged metallocene ligands having a dissimilar cyclopentadienyl groups can result from the reaction of 6,6-dimethyl fulvene with a substituted cyclopentadiene such as fluorene or substituted fluorene derivative to produce a ligand characterized by an isopropylidene bridge structure. Preferably, this ligand structure is characterized as having a bilateral symmetry such as indicated by the isopropylidene (cyclopentadienyl fluorenyl) structure as shown in Formula 9 of the aforementioned U.S. Pat. No. 5,807,800. As described in the Shamshoum et al '800 patent, the bilateral symmetry of the ligand structure is indicated by the balanced orientation about the broken line representing a plane of symmetry extending generally through the bridge structure and the transition metal atom.

As disclosed in the aforementioned U.S. Pat. No. 5,324,800 to Welborn supported catalysts can be prepared by converting a soluble metallocene to a heterogenous catalyst by depositing the metallocene on a suitable catalyst support. Other supported catalysts are disclosed in U.S. Pat. Nos. 4,701,432 and 4,808,561, both to Welborn, U.S. Pat. No. 5,308,811 to Suga et al, U.S. Pat. No. 5,444,134, to Matsumoto, U.S. Pat. No. 5,719,241 to Razavi and the aforementioned U.S. Pat. No. 5,807,800 Shamshoum et al.

As described in the Welborn '432 patent, the support may be any support such as talc, an inorganic oxide, or a resinous support material such as a polyolefin. Specific inorganic oxides include silica and alumina, used alone or in combination with other inorganic oxides such as magnesia, titania, zirconia and the like. Non-metallocene transition metal compounds, such as titanium tetrachloride, are also incorporated into the supported catalyst component. The inorganic oxides used as support are characterized as having an average particle size ranging from 30–600 microns, preferably 30–100 microns, a surface area of 50–1,000 square meters per gram, preferably 100–400 square meters per gram, a pore volume of 0.5–3.5 cc/g, preferably about 0.5–2 cc/g. Generally, the particle size, surface area, pore volume, and number of surface hydroxyl groups are said to be not critical to the Welborn procedure. Silica is often the support material of choice. Specifically disclosed in Welborn is a catalyst in which bis(cyclopentadienyl)zirconium dichloride (unbridged metallocene) is supported on a high surface area silica dehydrated in dry nitrogen at 600° C. and characterized as Davison 952. The Welborn '561 patent discloses a heterogeneous catalyst which is formed by the reaction of a metallocene and an alumoxane in combination with the support material. The support in Welborn '561 is described similarly as the support in the Welborn '432 patent. Various other catalyst systems involving supported metallocene catalysts are disclosed in U.S. Pat. Nos. 5,308,811 to Suga et al and 5,444,134 to Matsumoto. In both patents the supports are characterized as various high surface area inorganic oxides or clay-like materials. In the patent to suga et al, the support materials are characterized as clay minerals, ion-exchanged layered compounds, diatomaceous earth, silicates, or zeolites. As explained in Suga, the high surface area support materials should have volumes of pores having radii of at least 20 Angstroms. Specifically disclosed and preferred in Suga are clay and clay minerals such as montmorillonite. The catalyst components in Suga are prepared by mixing the support material, the metallocene, and an organoaluminum compound such as triethylaluminum, trimethylaluminum, various alkylaluminum chlorides, alkoxides, or hydrides or an alumoxane such as methylalumoxane, ethylalumoxane, or the like. The three components may be mixed together in any order, or they may be simultaneously contacted. The patent to Matsumoto similarly discloses a supported catalyst in which the support may be provided by inorganic oxide carriers such as $SiO_2$, $Al_2O_3$, MgO, $ZrO_2$, $TiO_2$, $Fe_2O_3$, $B_2O_2$, CaO, ZnO, BaO, $ThO_2$ and mixtures thereof, such as silica alumina, zeolite, ferrite, and glass fibers. Other carriers include $MgCl_2$, $Mg(O-Et)_2$, and polymers such as polystyrene, polyethylene, polypropylene, substituted polystyrene and polyarylate, starches and carbon. The carrier has a surface area of 1–1000 $m^2/g$, preferably 50–500 $m^2/g$, a pore volume of 0.1–5 $cm^3$ g, preferably 0.3–3 $cm^3/g$, and a particle size of 20–100 microns.

Of the various inorganic oxides used as supports, silica, in one form or another, is widely disclosed as a support material for metallocene catalysts. The aforementioned U.S. Pat. No. 5,719,241 to Razavi, while disclosing a wide range of inorganic oxides and resinous support materials, identifies the preferred support as a silica having a surface area between about 200 and 600 $m^2/g$ and a pore volume between 0.5 and 3 ml/g. Specifically disclosed is a support identified as Grace '952 having a surface area of 322 $m^2/g$. In preparing the supported metallocenes as described in Razavi, the silica is dried under a vacuum for three hours to remove water and then suspended in toluene where it is reacted with methylalumoxane for three hours at reflux temperature. The silica is washed three times with toluene to remove the unreacted alumoxane after which a solution of two metallocenes is added and the mixture stirred for an hour. The supernatant liquid is then withdrawn, and the solid support containing the metallocene is washed with toluene and then dried under vacuum. Silica characterized as Davison D-948 or Davison D-952 also appears as a conventional metallocene support. For example, U.S. Pat. No. 5,466,649 to Jejelowo discloses the use of dehydrated Davison D-948 silica as a support for various unbridged metallocenes used in conjunction with supported co-catalysts. U.S. Pat. No. 5,498,581 to Welch et al discloses silica for use as a support for either bridged or unbridged metallocenes in which the silica is treated with carbon monoxide, water, and hydrocyl groups. Specifically disclosed is the silica, Davison D-948, having an average particle size of 50 microns. Other silica-based supports are disclosed in U.S. Pat. Nos. 5,281,679 to Jejelowo, 5,238,892 to Chang, and 5,399,636 to Alt. The Chang and Jejelowo patents disclose the use of a silica support identified as Davison D-948, which is characterized as a amorphous silica gel containing about 9.7 wt. % water. As described in the Chang and Jejelowo patents, alumoxane is formed directly on the surface of the silica gel by direct reaction of an alkyl aluminum with silica gel which is undehydrated so as to ensure the conversion of the quantity of the alkyl aluminum to an alumoxane that has a high degree of oligomerization. The water-impregnated gel is characterized as having a surface range of 10–700 $m^2/g$, a pore volume of about 0.5–3 cc/g, and an absorbed water content of from about 10–50 wt. % in the case of the Jejelowo patent and about 6–20 wt. % in the case of the Chang patent. The average particle size for the silica is described in Chang to be from 0.3–100 microns and in Jejelowo from about 10–100 microns. After the alumoxane silica gel component has been formed, the metallocene may be added to the wet slurry.

Other supported catalyst systems are disclosed in European Patent Application No. 96111719.9 (EPO 819706Al) to Shamshoum et al. Here a silica support such as described above is pretreated with an alumoxane, such as methylalumoxane followed by addition of a syndiospecific metallocene on the MAO-treated silica. The supported metallocene is used in conjunction with an organo-aluminum co-catalyst such as a monoalkyl or dialkyl aluminum halides as described previously, or trialkylaluminums such as trimethylaluminum, triethylaluminum or tri-isobutyl aluminum (TIBAL). In the supported catalyst disclosed in EPO819706, the silica support is a high surface area, small pore size silica which is first dried, slurried in a non-polar solvent, and then contracted with methylalumoxane in a solvent. The metallocene was then dissolved in a non-polar solvent, particularly the same as used as the solvent for the alumoxane. The solid metallocene supported on the alumoxane-treated silica is then recovered from the solvent, dried, and then incorporated into carrier liquid such as mineral oil. The Shamshoum EPA application also discloses a pre-polymerization step which can be used to decrease the aging time of the catalyst in the trialkyl aluminum or other aluminum co-catalyst.

Yet, other supported catalyst systems incorporating bridged metallocene catalysts are disclosed in U.S. Pat. No. 5,968,864 to Shamshoum et al. Here, catalyst efficiency is improved by preparation procedure in which a support such as silica is treated with alumoxane in a non-polar solvent such as toluene and contacted with a solution of a metallocene at a reduced temperature, preferably in the range of 0° C. to −20° C. The resulting solid is then washed with hexane and dried overnight at room temperature.

SUMMARY OF THE INVENTION

In accordance with the present invention, there is provided a process for the preparation of a silica-supported metallocene catalyst in which the metallocene and co-catalysts components can be tailored with respect to the particulate silica support to provide a supported catalyst system which can be isolated and stored in a mineral oil slurry for prolonged periods of time and then used in the production of stereoregular polymers while alleviating or eliminating problems associated with reactor fouling and undesirable polymer fines. The resulting supported catalyst provides good activity which can be maintained when the process is used to produce an isospecific or a syndiospecific supported catalyst.

In carrying out the invention, there is provided a particulate catalyst support material comprising silica particles impregnated with an alumoxane co-catalyst with at least one-half of the co-catalyst disposed within the internal pore volume of the silica. The support material is contacted with a dispersion of a metallocene catalyst in an aromatic hydrocarbon solvent. The metallocene solvent dispersion and the alumoxane-containing support are mixed at a temperature of about 10° C. or less for a period sufficient to enable the metallocene to become reactively supported on and impregnated within the alumoxane-impregnated silica particles. Following the mixing time, which typically can vary from a few minutes to a number of hours, the supported catalyst is recovered from the aromatic solvent and then washed optionally with an aromatic hydrocarbon and then sequentially with a paraffinic hydrocarbon solvent in order to remove substantial quantities of aromatic solvent from the supported catalyst. These washing procedures are carried out at a low temperature of about 10° C. or less. Thereafter, the washed catalyst is dispersed in a viscous mineral oil having a viscosity which is substantially greater than the viscosity of the paraffinic hydrocarbon solvent. Typically, the mineral oil is a viscosity at 40° C. of at least 65 centistokes (units) as measured by ASTM D445. This may be contrasted with the viscosity of the paraffinic hydrocarbon solvent which usually will be no more than 1 centipoise at the reduced temperature conditions. Steps should not be taken to dry the washed catalyst, and typically the washed catalyst at the time of the dispersion will contain a substantial residual amount of the paraffinic hydrocarbon solvent. Preferably, after the supported catalyst is recovered from the aromatic solvent and before washing with the paraffinic hydrocarbon solvent, a further washing step is carried out with an aromatic solvent to remove unsupported metallocene from the supported catalyst.

In a further aspect of the invention, there is provided a particulate catalyst support comprising spheroidal silica particles having an average particle size within the range of 10–100 microns and an average effective pore diameter within the range of 200–400 Angstroms. Typically, the silica will be dried at an elevated temperature for a period of time to moderately dehydrate the silica. Often a mild heat treatment such as 100° C. to 160° C. is sufficient although higher temperatures can be employed. The silica support is than contacted with an alumoxane co-catalyst in an aromatic carrier liquid. The mixture of support, carrier liquid, and alumoxane co-catalyst is heated at an elevated temperature for a period of time to fix the alumoxane on the silica support with at least one-half of the alumoxane disposed internally within the silica support. For example, the mixture may be heated under reflux conditions of about 100° C. or more for a period ranging from one hour to several hours. The mixture is then cooled and the alumoxane-containing support is separated from the carrier liquid. The alumoxane-containing support material is then washed with an aromatic hydrocarbon solvent in order to remove excess unsupported or free alumoxane (or aluminum alkyl residuals) so that substantially all of the alumoxane is fixed to the support. The alumoxane-containing support material is then cooled to a reduced temperature of about 10° C. or less, and a dispersion of metallocene in an aromatic solvent is added with mixing as described above at a temperature of about 10° C. or less to allow the metallocene to become reactively supported on and impregnated within the alumoxane-impregnated silica particles. The supported catalyst is then recovered, washed with a low viscosity paraffinic hydrocarbon solvent at a reduced temperature of about 10° C. or less as described above and then dispersed in a viscous mineral oil. Alternatively, the catalyst is washed with mineral oil and no paraffinic hydrocarbon solvent is used. Polyolefin catalysts prepared in this fashion have superior performance qualities such as higher activity.

Figure 1:
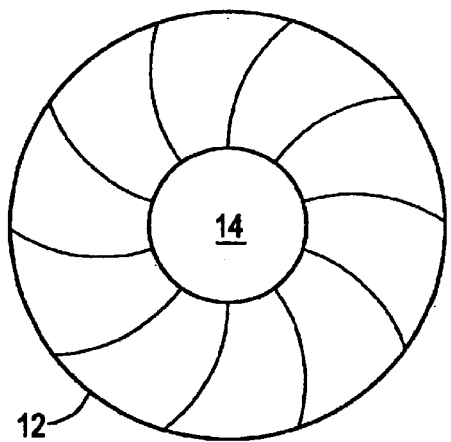
FIG. 1 is a front elevational view showing an idealized depiction of a generally spherical catalyst particle which can be employed in carrying out the present invention.

DETAILED DESCRIPTION OF THE INVENTION the present invention involves processes for the preparation of supported metallocenes which are carried out generally under low temperature conditions for the deposition of metallocene catalysts on the alumoxane-containing support and in which the supported metallocene, once obtained, is directly dispersed in a mineral oil carrier. Such supported catalysts are suitable for use in the polymerization of ethylene, propylene, and higher olefins, including the homopolymerization of such olefins or the copolymerization thereof, such as in the preparation of ethylene/propylene copolymers. The procedure is in contrast to the prior art procedure, such as disclosed in the aforementioned patents to Welborn in which the metallocene and alumoxane are added generally at room temperature conditions, and regardless of the order of addition employed, the final catalyst particles are dried for prolonged periods of time in order to remove volatile materials. Similarly, in procedures such as disclosed in the aforementioned Razavi '241 patent where alumoxane is added first and mixed with the support at reflux temperature, the final supported catalyst is dried under vacuum. In contrast with the prior art procedure, the present invention proceeds, once the alumoxane is fixed on the silica support, to carry out the metallocene support reaction under low temperature conditions, typically within the range of about −20°–10° C. followed by washing the catalyst with hydrocarbons and directly dispersing the washed catalyst into a viscous mineral oil without an intervening drying step. The washes and dispersals of catalysts into the mineral oil is carried out under subambient temperature conditions.

The supported catalyst produced in accordance with the present invention provides several important features. Metallocene loading and alumoxane loading on the support material can be controlled to desired levels. This is particularly significant in the case of the silica supports preferred for use in the present invention where it is desired to control alumoxane/silica ratios to levels which may vary depending upon the nature of the metallocene component. Particularly in the case of stereospecific matallocenes, the alumoxane/silica ratio is controlled to arrive at desired ratios for effective characteristics of the final catalyst in terms of metallocene activation, polymer fines, fouling during the polymerization procedure, and imperfections sometimes referred to as "fish eyes" in finished products produced from the olefin polymer. Moreover, for metallocenes and support materials other than the preferred sterospecific metallocenes and silica supports, the invention still provides a process in which loading of the metallocene on an alumoxane containing support can be accomplished at relatively low temperatures and by direct dispersion of the supported catalyst into a viscous mineral oil dispersion without an intervening drying step as commonly practiced in the prior art techniques. The resulting catalyst systems have generally higher activities with very little decay in activity, i.e. long "shelf life," during storage prior to use especially when the catalyst is stored cold.

The catalysts further are subject to activity enhancement by aging with an alkylaluminum compound, such as tri-isobutylaluminum (TIBAL) in accordance with an aging procedure as disclosed in U.S. patent application Ser. No. 09/086,080, filed May 28, 1998, by Edwar Shamshoum et al, entitled "Process for the Syndiotactic Propagation of Olefins." Briefly, activity enhancement of the catalyst can be accomplished by aging the supported metallocene in an organoaluminum compound, specifically TIBAL, in a mineral oil overnight (about 12 hours) or for further periods, e.g., for one or two days, in accordance with the following procedure. A specific aging procedure involves contacting equal parts of the supported metallocene and equal parts of the TIBAL in a mineral oil slurry and allowing them to stand at room temperature, 25° C. for an overnight period (about 12 hours) prior to polymerization. A typical master batch of the syndiospecific catalyst or the isospecific catalyst can be prepared from a slurry of 180 mg. of the supported metallocene (the metallocene and the support), 8.3 ml. of mineral oil, and 180 mg. of the TIBAL in a concentration of 25 wt. % in hexane. After the overnight aging procedure, a 1.0 ml. aliquot of the master slurry is used for each propylene polymerization. For further description of the aging process, reference is made to the aforementioned application Ser. No. 09/086,080, the entire disclosure of which is incorporated herein by reference.

The particulate silica support employed in the present invention comprises generally spheroidal silica particles having an average diameter within the range of 20–60 microns, preferably 20–30 microns, and pore sizes which accommodate internal support of both the alumoxane and the metallocene. The preferred form of silica support is characterized by generally spheroidal silica particles having generally axial depressions, sometimes extending completely through the particle, to provide a toroidal configuration to the particle. A silica support of this nature is available from Fuji Silysia Chemical Company, Ltd., under the designation of P-10. The silica support P-10 has an average diameter of about 22 to 25 microns and a pore volume of 1.4 millimeters per gram. The metallocene catalyst and alumoxane co-catalyst are primarily supported within the pore surface area of the silica, as contrasted with the external surface area, with the amount of metallocene supported externally of the silica particle accounting for a minor fraction, usually no more than 10 wt. % of the total metallocene found on the silica support. Stated otherwise, a major fraction of more than 50% and preferably at least 90 wt. % of the metallocene is contained within the internal pore volume of the silica support. An improved polymer characterized in terms of reduced gel defects is observed for catalysts supported on relatively high surface areas, small particle size spheroidal silica particles. While the Applicants' invention is not to be limited by theory, it is postulated that these spheroidal silica particles employed in the present invented become highly fractured during the polymerization procedure. The fracturing of the spheroidal silica particles not only continuously exposes more transition metal sites to the monomer insertion mechanism during the polymerization process, it ultimately reduces the silica particles to a size such that they do not result in significant numbers of gel defects. Thus, the toroidal silica particles, while initially having an average particle size of about 20–21 microns, increasing to perhaps 24 microns after the alumoxane-loading reaction, are believed ultimately to fracture during the polymerization procedure to a size of about five microns or less, usually about three microns or less, with an attendant highly significant reduction in gel imperfections. The silica particles of a spheroidal configuration which can be employed in carrying out the present invention are shown schematically and in highly-idealized form in FIGS. 1, 2, and 3.

Figure 2:
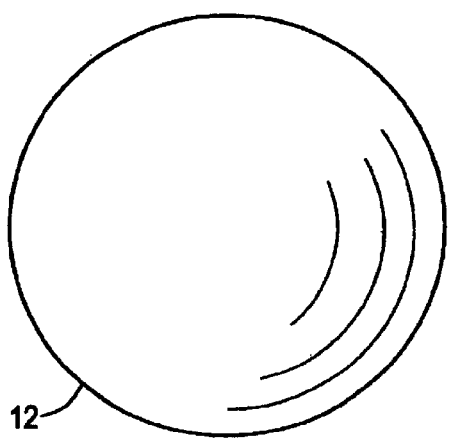
FIG. 2 is a transverse side elevational view of the catalyst particle of FIG. 1.
Figure 3:
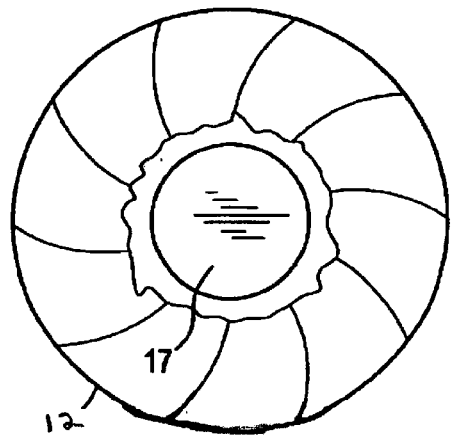
FIG. 3 is a front elevational view of an idealized depiction of a modified form of a catalyst particle corresponding to the catalyst particle of FIGS. 1 and 2.
Figure 4:
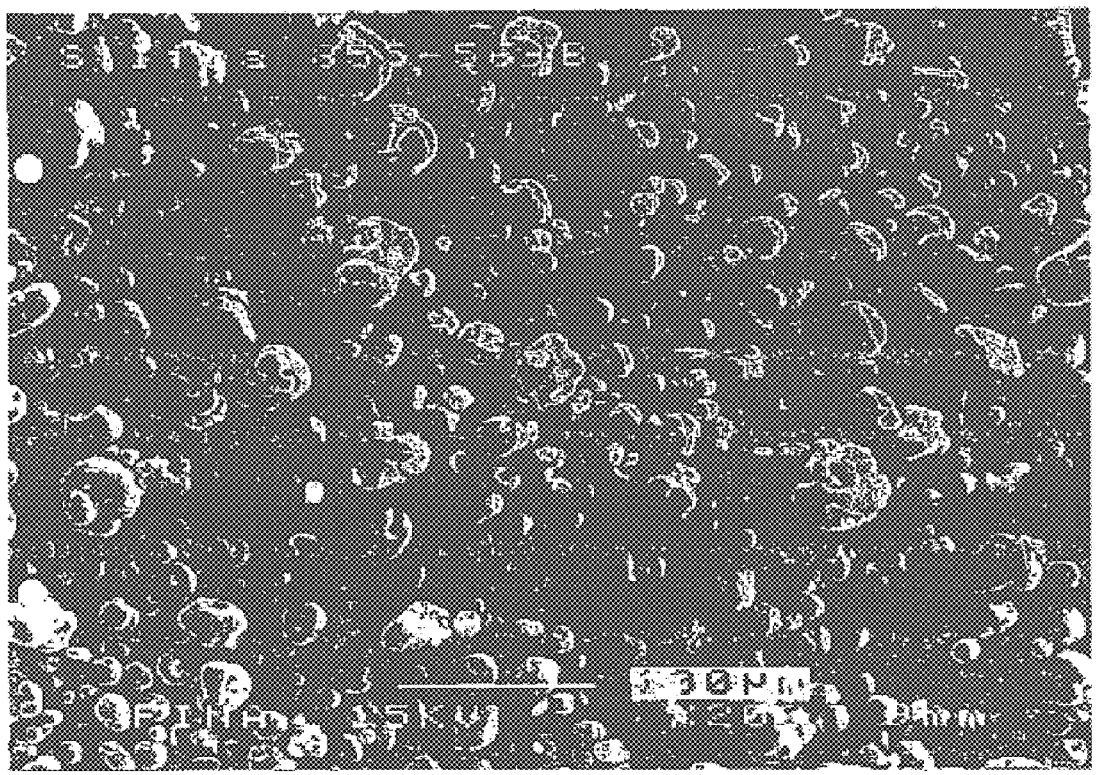
FIGS. 4, 5, and 6 are photographs of catalyst support particles generally conforming to the support particles ideally depicted in FIGS. 1, 2, and 3.
Figure 5:
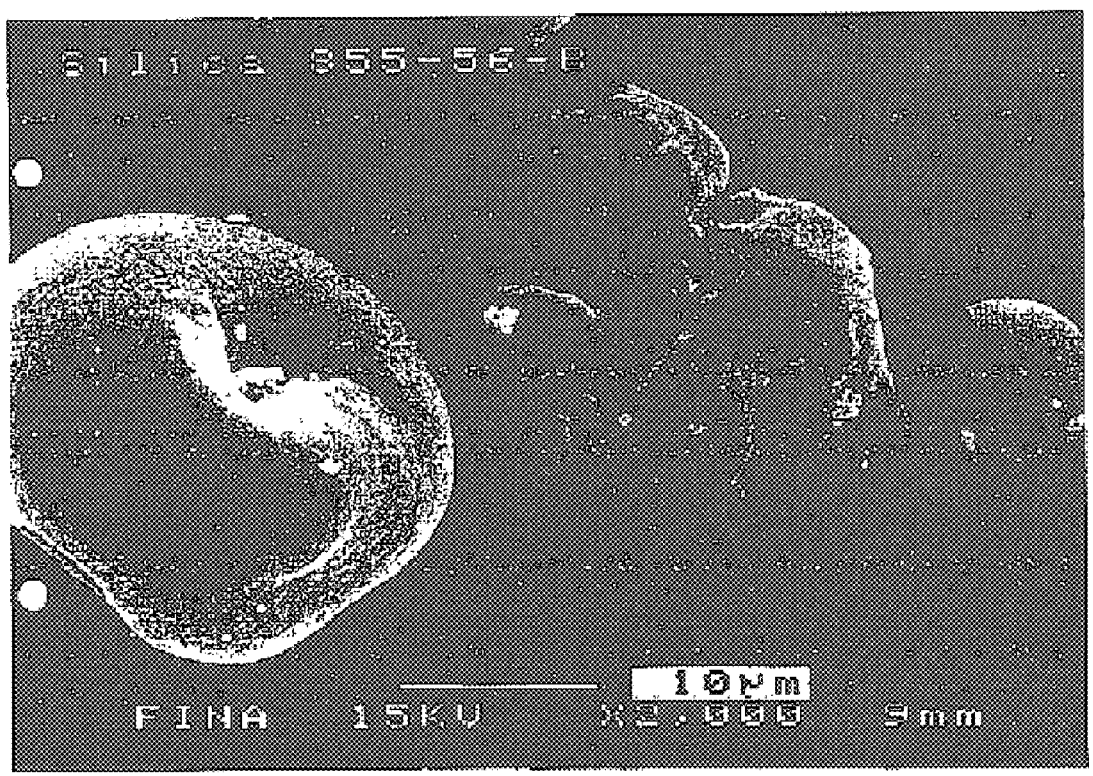
Figure 6:
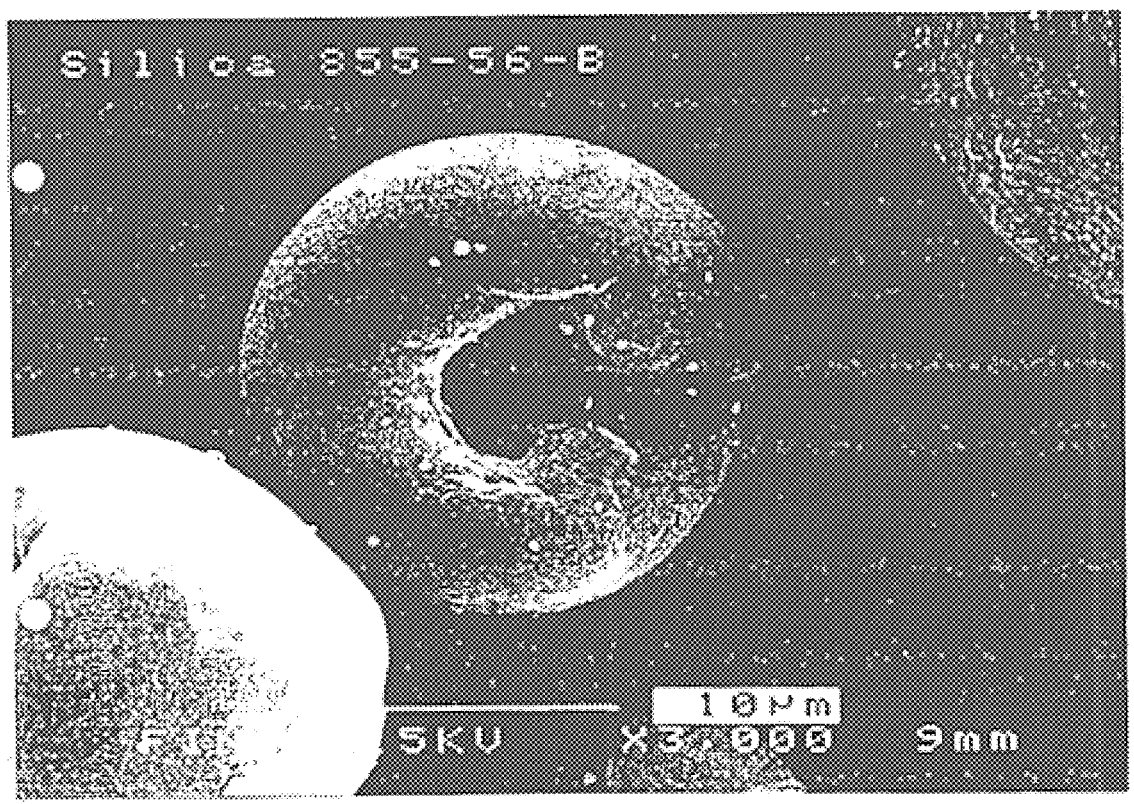

As shown in FIG. 1, a generally spherical silica particle 12 is characterized by a central bore 14 so that the silica particle is of a spherical annular configuration. When viewed from the front elevation of FIG. 1, the silica particle is generally shown to resemble a donut and, hence, is referred to as having a "toroidal-type" configuration. As shown in FIG. 2, when viewed from a side elevation, the central bore is not apparent, and the silica particle 12 appears to conform generally to a solid spherical configuration. FIG. 3 is a view corresponding to FIG. 1 and shows a "toroidal" configuration in which the central bore does not extend completely through the catalyst particle 16 but instead forms a pronounced depression 17 so that when viewed from the side of the depression, the silica particle is still reminiscent of a "toroidal" configuration. Other suitable silica supports can be employed in carrying out the present invention. They should be characterized in terms of having a pore volume in excess of 1 millimeter per gram in order to provide an internal disposition within the pore volume of the support.

As noted previously, the present invention provides a process for loading of a metallocene catalyst precursor on an alumoxane-containing support material with subsequent dispersion in a mineral oil carrier liquid as well as a preferred procedure for loading alumoxane on a support material which is particularly applicable to certain silica supports. However, the invention, while especially preferred for use employing the silica supports, can also be carried out with other support materials, such as disclosed, for example, in the aforementioned U.S. Pat. No. 5,719,241 to Razavi, and which includes polyolefins, such as polyethylene or polypropylene, polystyrenes, and inorganic oxides other than silica, such as alumina, magnesia, titania, and other inorganic oxides. Talc, such as disclosed in Razavi, and clay and clay minerals, such as disclosed in the aforementioned patent to Suga et al, can also be used as support material. Zeolite and glass fibers can be used as well as other inorganic oxides, such $Fe_2O_3$, $B_2O_2$, CaO, ZnO, BaO, $ThO_2$, $MgCO^2$, and $Mg(O-Et)_2$, disclosed in the aforementioned patent to Matsumoto, can be used also in the present invention, although they usually will be less desirable than the preferred silica supports. Support materials which can be used in carrying out the present invention, are disclosed in the aforementioned U.S. Pat. Nos. 5,719,241 to Razavi, 5,308,811 to Suga et al, and 5,444,134 to Matsumoto, the entire disclosures of which are incorporated herein by reference.

The metallocenes employed in the present invention include metallocene compounds which are known as useful in olefin polymerization procedures and include monocyclic, bicyclic, or tricyclic moieties as disclosed in the aforementioned U.S. Pat. No. 5,324,800 to Welborn and U.S. Pat. No. 5,719,241 to Razavi et al. The metallocenes employed in the present invention include stereospecific metallocene compounds, specifically isospecific and syndiospecific metallocenes. As discussed below, different parameters in terms of alumoxane loading and metallocene content are applicable in forming isospecific and syndiospecific supported metallocenes, and the present invention readily accommodates close control of alumoxane and metallocene loading within relatively narrow ranges.

Stereorigid metallocenes, which are preferred for use in the present invention, can be characterized as metallocenes incorporating a ligand structure having at least one suitable substituent on at least one cyclopentadienyl ring coordinated with a central transition metal. At least one of the cyclopentadienyl rings is substituted and provides an orientation with respect to the transition metal, which is sterically different from the orientation of the other cyclopentadienyl group. Thus, both of the cyclopentadienyl groups are in a relationship with one another providing a stereorigid relationship relative to the coordinating transition metal atom to substantially prevent rotation of the ring structures. The sterically dissimilar ring structures may be chemically identical as in the case of certain isospecific metallocenes or chemically different as in the case of syndiospecific metallocenes. However, if two chemically identical cyclopentadienyl groups are involved in the ligand structure, they must be sterically different, as in the case of racemic bis(indenyl) structures, rather sterically the same relative to the transition metal, as in the case of meso bis(indenyl) ligand structures.

Bridged isospecific metallocenes can be characterized as chiral stereorigid metallocenes defined by the following formula:

$$R''(Cp(R')_4)_2MeQ_p \qquad (7)$$

wherein each $(Cp(R')_4)$ is a substituted cyclopentadienyl ring; each R' is the same or different and is a hydrogen or hydrocarbyl radical having 1–20 carbon atoms; R'' is a structural bridge between the two $(Cp(R')_4$ rings imparting stereorigidity to said catalyst with the two $(C_5(P')_4)$ rings being in a racemic configuration relative to Me, and R'' is selected from the group consisting of a substituted or unsubstituted alkylene radical having 1–4 carbon atoms, a silicon hydrocarbyl radical, a germanium hydrocarbyl radical, a phosphorus hydrocarbyl radical, a nitrogen hydrocarbyl radical, a boron hydrocarbyl radical, and an aluminum hydrocarbyl radical; Me is a group 4b, 5b, or 6b metal as designated in the Periodic Table of Elements; each Q is a hydrocarbyl radical having 1–20 carbon atoms or is a halogen; and $0 \leq p \leq 3$.

A particularly preferred class of isospecific metallocenes are based upon racemic bis(indenyl) ligand structures. The indenyl groups may be substituted or unsubstituted and include aromatic indenyl groups as well as saturated indenyl groups, such as tetrahydroindenyl groups also substituted or unsubstituted. Specific examples of isospecific metallocenes suitable for use in the present invention include isopropylidene bis-(2,3 dimethylcyclopentadienyl) zirconium dimethyl, isopropylidene bis (tetramethylcyclopentadienyl) zirconium dimethyl, and racemic isopropylidene bis (2, 4 dimethylcyclopentadienyl) zirconium dimethyl, ethylene bis-(indenyl)zirconium dimethyl and the corresponding dichlorides. Other metallocenes include ethylene bis(2-methyl indenyl) zirconium dichloride, dimethyl silyl bis(2-methyl indenyl) zirconium dichloride, diphenyl silyl bis(2-methyl indenyl) zirconium dichloride, dimethyl silyl bis(2-methyl-4,5-benzoindenyl) zirconium dichloride, diphenyl silyl bis(2-methyl-4-phenyl-indenyl) zirconium dichloride, and diethyl silyl bis(2-methyl-4-phenyl indenyl) zirconium dichloride, benzo indenyl metallocenes.

Bridged syndiospecific metallocenes can be characterized by metallocenes which exhibit bilateral symmetry and are defined by the formula:

$$R''(Cp_aR_n)(Cp_bR'_m)MeQ_p \qquad (8)$$

wherein $Cp_a$ is a substituted cyclopentadienyl ring, $Cp_b$ is an unsubstituted or substituted cyclopentadienyl ring; each R is the same or different and is a hydrocarbyl radical having 1–20 carbon atoms; each $R'_m$ is the same or different and is a hydrocarbyl radical having 1–20 carbon atoms; R'' is a structural bridge between the cyclopentadienyl groups imparting stereorigidity to the catalyst and is selected from the group consisting of a substituted or unsubstituted alkylene radical having 1–4 carbon atoms, a silicon hydrocarbyl radical, a germanium hydrocarbyl radical, a phosphorus hydrocarbyl radical, a nitrogen hydrocarbyl radical, a boron hydrocarbyl radical, and an aluminum hydrocarbyl radical; Me is a group 4b, 5b, or 6b metal from the Periodic Table of Elements; each Q is a hydrocarbyl radical having 1–20 carbon atoms or is a halogen; $0 \leq p \leq 3$; $0 \leq m \leq 4$; $1 \leq n \leq 4$; and wherein $R'_m$ is selected such that $(Cp_bR'_m)$ is a different ring than $(Cp_aR_n)$. Bridged syndiospecific metallocenes which may be employed in the present invention include isobutylidene(cyclopentadienyl-1-fluorenyl), zirconium dimethyl, isopentylidene (cyclopentadienyl-1-fluorenyl) zirconium dimethyl, isopropylidene (cyclopentadienyl) (2,7,di-t-butyl fluorenyl) zirconium dimethyl, isopropylidene (cyclopentadienyl-1-fluorenyl)zirconium dimethyl, diphenyl methylene (cyclopentadienyl-1-fluorenyl)zirconium dimethyl, and the corresponding dichlorides or methylchlorides.

As noted previously by reference to U.S. Pat. No. 5,807,800, the bilateral symmetry of a bridged metallocene ligand structure is indicated by the balanced orientation about the broken line representing a plane of symmetry extending generally through the bridge structure and the transition metal atom. The concept of bilateral symmetry is useful to illustrate metallocene structures that are useful for the invention. Other metallocene compounds which lack bilateral symmetry can also be used however as long as the steric environment about the metal is such that the two coordination sites on the transition metal possess opposite enantioface selectivity. To illustrate this point, consider the MePhC-cyclopentadienyl fluorenyl zirconium dichloride. This metallocene lacks bilateral symmetry by virtue of the asymmetric bridge and yet would be suitable for use in the invention. Similarly, $Me_2C(2\text{-Me-Cp})(Flu)ZrC_2$ would also yield a syndiospecific catalyst although it lacks bilateral symmetry. The key requirement of a transition metal catalyst precursor is that the reaction sites possess opposite enantioface selectivity towards olefin insertion. Visually this can be depicted below. Opposite enantioface selectivity of the metallocene catalyst precursor is established by an arrangement about the metal in which $R_2$ and $R_3$ are sterically larger than groups $R_6$ and $R_7$ or conversely, $R_6$ and $R_7$ are sterically larger than $R_2$ and $R_3$. In the case of $Me_2 CpFluZrCl_2$, $R_2$ and $R_3$ are hydrogen atoms and $R_6$ and $R_7$ are hydrocarbyl radicals which are clearly larger than hydrogen.

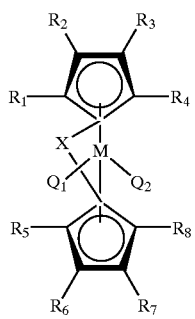

Condition for Syndiospecific Polymerizations
  $R_2$ and $R_3$ are sterically larger than $R_6$ and $R_7$ OR
  $R_6$ and $R_7$ are sterically larger than $R_2$ and $R_3$
Condition for Isospecific Polymerizations
  $R_2$ is sterically larger than $R_6$
  and $R_7$ is sterically larger than $R_3$ OR
  $R_6$ is sterically larger than $R_2$ and
  $R_3$ is sterically larger than $R_7$
Usually, in the metallocenes employed in the present invention, Me is titanium, zirconium, hafnium, or vanadium; Q is, preferably, a methyl or halogen, more preferably chlorine; and k normally is 2 but may vary with the valence of the metal atom. Exemplary hydrocarbyl radicals include methyl, ethyl, propyl, isopropyl, butyl, isobutyl, amyl, isoamyl, hexyl, heptyl, octyl, nonyl, decyl, cetyl, phenyl, and the like. Other hydrocarbyl radicals include other alkyl, aryl, alkenyl, alkylaryl, or arylalkyl radicals. For metallocenes in which the oxidation state is not stable during use or storage (for example Group 5-based metallocenes) it is often useful to use halogenated substances such as carbon tetrachloride, chloroform, etc. in order to maintain good catalytic performance.

While different loading factors are preferred for syndiospecific and isospecific catalysts, the same general procedure in loading first the alumoxane and then the metallocene on the support material is applicable for both isospecific and syndiospecific metallocenes as well as for other metallocenes. The invention can be generally described, without regard to the particular metallocene, as follows. The particulate silica support is dried to remove a substantial amount of its water content. The drying procedure can be carried under nitrogen overnight (about 12 hours) at a temperature of about 100°–160° C. The silica should be dried to the point where the amount of weight loss on ignition (LOI) at 300° C. is less than 4%, preferably less than 2% and most preferably within the range of about 0.1–1.5 wt. %. The dried silica is then slurried in toluene or another similar aromatic hydrocarbon solvent. A solution of an alumoxane, preferably methylalumoxane (MAO) although other alumoxanes can be used, in toluene (or other aromatic solvent) is then added to the silica/toluene mixture, and as the silica and MAO are mixed together, the resulting slurry is heated to a temperature of about 100° C. or more and then heated for a period of several hours. By way of example, where toluene is used as the aromatic solvent, the MAO silica/toluene mixture can be heated at the reflux temperature of the toluene, about 115° C. for a period of about 4 hours. The resulting product in which the MAO is fixed on the support is then cooled to ambient temperature, about 25° C., over a period of several hours and then allowed to settle so that the particulate silica with the MAO supported thereon settles out of solution without mixing or other agitation. The liquid is removed by decantation, and the particulate material is filtered out and subjected to several toluene washes in order to remove excess alumoxane or other aluminum compounds not fixed on the support. Typically, 2 to 4 toluene washes at ambient temperature conditions will be employed in this phase of the procedure.

At this point the alumoxane-containing support is mixed with chilled toluene of about 10° C. or less. Typically, the temperature at this phase and in the subsequent phases will be within the range of about 0° to 10° C. Substantially cooler temperatures can be used but are often unnecessary. At this temperature, the metallocene dispersed in the toluene or other aromatic solvent, again at the reduced temperature, is added to the MAO/silica slurry and the resulting mixture agitated for a period of time to allow the metallocene to become reactively supported on the support material with the alumoxane. Although the predominant part of the reaction of the metallocene with the support takes place over an initial period of several minutes, it will usually be desirable to maintain the mixing of the support and metallocene for a period of one or more hours. The mixing time can range up to several hours if desired.

At the conclusion of the support reaction, the solid material is filtered from the liquid and then washed with a cold toluene solution, typically at 0°–10° C., and filtered and washed several times with a paraffinic hydrocarbon solvent such as hexane, again at a temperature of about 10° C. or less. Three sequential hexane washes may be carried out in order to substantially reduce the amount of toluene on the support material to a low level typically less than a few percent. At this stage, cold mineral oil is added to the supported catalyst in the filtrate in order to form a dispersion of the catalyst in the mineral oil. There is, as described above, no necessity of an intervening drying step, so the resulting dispersion of mineral oil will contain a minor amount of the hexane or other paraffinic solvent and even a smaller amount of the toluene or other aromatic solvent. However, a drying step can be applied immediately prior to addition of the mineral oil.

The mineral oil should have a sufficient viscosity to maintain the supported catalyst in a dispersive suspension with mild agitation when it is used in a polymerization reaction. The mineral oil will, of course, have a viscosity substantially greater than the viscosity of the paraffinic hydrocarbon solvent. Typically, at 10° C. the paraffinic mineral oil will have a viscosity of about 10 centistokes or more while the viscosity of the paraffinic hydrocarbon solvent again at 10° C. will be about one centistroke or less. The final liquid dispersing agent will contain a minor amount of the more volatile paraffinic solvent used in washing toluene off the supported catalyst and an even smaller amount of the aromatic solvent itself. Typically, the residual paraffinic and aromatic solvent indicated above, would be present in about 1–15 wt. % of the mineral oil and will be about 0.1–13 wt. % of the hexane or other paraffinic solvent and less than 2 wt. % of the toluene or other aromatic solvent. Optionally, the oil can be evacuated or sparged with inert gas to remove residual paraffinic and aromatic solvent. As noted previously, the present invention may be employed to incorporate the alumoxane co-catalyst and metallocene on a wide variety of supports.

Characteristic of the silica supports, such as these described above, is that the alumoxane is deposited primarily within the pore volume of the support with usually only a minor portion on the outer surface of the support particles. The metallocene is then applied over the alumoxane to provide a configuration in which the alumoxane forms a lining on the pore walls of the support with the metallocene contacting and generally overlying the alumoxane lining. On the outer surface of the support the alumoxane in a minor amount forms an intermediate shell encompassing the support particle and the metallocene forms an outer shell overlying the alumoxane. The treatment with the toluene or other aromatic solvent subsequent to the alumoxane support reaction removes excess alumoxane which is not fixed on the support so that it, together with the associated metallocene later applied, does not become released from the support during the polymerization reaction. Similar considerations apply with respect to the subsequently-applied metallocene. The metallocene, as noted above, enters the pore space of the support and is also supported on the outer surface as an outer shell surrounding the organoaluminum co-catalyst. As the support particles fracture during polymerization, excess metallocene is readily subject to becoming dislodged during the polymerization reaction with the attendant production of fouling within the polymerization reactor. By the initial cold temperature washes with the toluene or other aromatic solvents on the freshly supported catalyst, excess metallocene is removed, not only from the outer surface but also from the pore space of the support, to produce the final product in which substantially all of the metallocene is fixed to the support. In order to avoid any desorption of metallocene by residual toluene, the subsequent cold washes with hexane or other hydrocarbon removes the great preponderance for metallocene desorption.

As noted above, the invention is particularly applicable to silica supports having an average particle size within the range of about 10–100 microns in which the organoaluminum compounds and later the metallocene are supported internally within the pore space of the support particles. As described below, the relative amount of alumoxane on the support will, in preferred embodiments, be present in an amount to provide a weight ratio of 0.6–2.0 parts alumoxane in the starting reaction mixture to one part support material, but the amounts may vary within this range depending and whether an isospecific or syndiospecific metallocene is involved. Preferred alumoxane ratios for both isospecific and syndiospecific are between 0.5 and 1.5 parts alumoxane in the starting reaction mixture to one part support material. Metallocene loadings will normally vary from about 0.1–6 wt. % of the MAO/support material, with optimal loadings being between 1.0 to 1.5 wt. %. While activity appears to increase with metallocene loading, this tends to plateau at loadings of about 1.0–2.0 wt. % with very little, if any, increase in activity achieved for loadings above this range.

With either syndiospecific or isospecific metallocenes, several substantial improvements are observed to result from the practice of the present invention over the typical prior art procedures described above. The catalyst activity is substantially higher for both isospecific and syndiospecific metallocenes, increasing by as much as twofold over the activity of the catalyst prepared following the prior art practice. The syndiospecific and isospecific catalysts showed increase in activity when a TIBAL aging procedure was followed. The polymer product produced by the catalysts formed in accordance with the present invention has a higher bulk density, typically increased within the range of about 15–20% for the isospecific metallocenes. For both the isospecific and syndiospecific catalysts, the shelf life of the catalyst dispersed in the mineral oil without the conventional intervening drying step is much greater than the catalyst produced by conventional techniques. The improved shelf life may be characterized on the order of 3 months or more versus a matter of weeks of shelf life for catalysts produced by conventional techniques.

Experimental work respecting the present invention was carried out employing three bridged isospecific catalysts and two bridged syndiospecific catalysts. The isospecific catalysts were all substituted racemic-bis(indenyl) zirconium dichlorides, including racemic dimethylsilyl bis(2-methyl-4-phenylindenyl) zirconium dichloride (referred to herein as Catalyst 1), racemic dimethylsilyl bis(2-methyl-indenyl) zirconium dichloride (Catalyst 2), and racemic dimethylsilyl bis(2-methyl-4,5-benzoindenyl) zirconium dichloride (Catalyst 3). To illustrate the invention with a syndiospecific catalyst, the following metallocene was used: diphenyl methylene (cyclopentadienyl) (fluorenyl) zirconium dichloride (Catalyst 4). To further illustrate that the invention is useful in the production of broad molecular weight distribution resins, a catalyst was prepared containing 1.6 wt. % of diphenyl methylene(cyclopentadienyl)(fluorenyl) zirconium dichloride and 0.4 wt. % isopropylidene (cyclopentadienyl)(2,7-di-tert-butylfluorenyl) zirconium dichloride (Catalyst 5). These isospecific and syndiospecific metallocenes were supported on MAO /silica using the process of the present invention and also supported in accordance with the standard technique carried out at room temperature or above and in which the catalyst component was dried in accordance with conventional procedure. In general, the supported isospecific catalyst prepared by the standard technique had activities ranging from about 3,000–6,000 grams of polymer per grams of catalyst per hour (g/g/hr) versus activities for the catalyst produced in accordance with the present invention within the range of about 8,000–13,500 g/g/hr. Bulk density of the polymer produced from the prior art catalyst ranged from about 0.3–0.36 g/ml whereas the bulk density of the polymer produced from the catalyst of the present invention ranged from about 0.35–0.4 g/ml. In addition, following the present invention the shelf life was increased from about two weeks to twelve weeks or more. Finally, the catalyst produced in accordance with the present invention could be stored as a non-pyrophoric slurry, as contrasted with the pyrophoric solid produced by the prior art techniques.

The following examples illustrate the practice of the present invention in preparing silica-supported metallocenes based upon the aforementioned Catalyst 1, 2, 3, 4, and 5.

General Procedure for Syndiotactic Polypropylene (sPP) Polymerization

Polymerizations were performed in a 4L Autoclave Engineers' Zipperclave reactor equipped with a Magnedrive pitched-blade impeller operating at 800 rpm. the reactor is jacketed to maintain polymerization temperature within 1° C. of a setpoint of 60° C. The dry and de-oxygenated reactor was charged under ambient conditions (25° C.) with 750 g of liquid propylene and 41.2 mmoles of hydrogen. The catalyst/oil slurry (36 mg catalyst/cocatalyst were precontacted for approximately 3 minutes and then flushed into the reactor with an additional 750 g aliquot of propylene. The reactor was heated to 60° C. over about 3 minutes and then the reaction was allowed to proceed for 60 minutes. The reactor contents were quickly vented and the polymer was allowed to dry overnight in a ventilated enclosure.

General Procedure for Isotatic Polypropylene (miPP) Polymerization

Polymerizations were performed in a 4L Autoclave Engineers' Zipperclave reactor equipped with a Magnedrive pitched-blade impeller operating at 800 rpm. The reactor is jacketed to maintain polymerization temperature within 1° C. of a setpoint of 67° C. The dry and de-oxygenated reactor was charged under ambient conditions (25° C.) with 750 g of liquid propylene and 10 mmoles of hydrogen. The catalyst/oil slurry (36 mg catalyst contained) was added to a stainless steel cylinder with 72 mg of triethylaluminum. The catalyst/cocatalyst were precontacted for approximately 3 minutes and then flushed into the reactor with an additional 750 g aliquot of propylene. The reactor was heated to 67° C. over about 3 minutes and then the reaction was allowed to proceed for 60 minutes. The reactor contents were quickly vented and the polymer was allowed to dry overnight in a ventilated enclosure.

Bulk Density Measurement

Bulk density measurements were conducted by weighing the unpacked contents of a 100 mL graduated cylinder containing the polymer powder.

Melt Flow Index Measurement

Polymer melt flow was recorded on a Tinius-Olsen Extrusion Plastometer at 230° C. with a 2.16 Kg mass. Polymer powder was stabilized with approximately 1 mg of 2,6-ditert-butyl-4-methylphenol (BHT).

Preparation of Methylaluminoxane-supported Silica

Silica gel (Fuji Silysia, P-10) was dried in an oven at 150° C. for 18 hours then transferred into a glove box for storage. 15 g of dried silica was placed in a 1L, 3-necked round-bottomed flask in a glove box with a condenser attached. The flask was sealed and removed from the glove box and attached to a Schlenk manifold under a slight positive pressure of nitrogen. To this was added 150 mL of dry deoxygenated toluene. The slurry was briefly agitated and 41 mLs of 30 wt. % MAO in toluene was added. The reaction mixture was heated to 115° C. and allowed to reflux for 4 hours using a magnetic stirrer. The slurry was allowed to cool to room temperature and settle. The toluene supernatent was removed via cannulae and the wet product was washed sequentially with three 150 mL portions of toluene followed by three 150 mL portions of dry, deoxygenated hexane. The MAO on silica was then dried in vacuo to obtain the white solid. Drying of the MAO on silica in this instance provides convenience in the laboratory evaluation of different catalysts.

EXAMPLE 1:

Preparation of miPP Catalyst 5 g of MAO on P-10 silica was added to a 100 mL round-bottomed flask with 30 mLs of toluene and the flask was cooled to 15° C. Rac-Me$_2$Si(2-Me-4-PhInd)$_2$ZrCl$_2$ (65 mg) was slurried into 10 mLs of toluene in a 20 mL Wheaton vial. The metallocene slurry was added to a stirred solution of the MAO on silica. The transfer of metallocene was completed with a second 10 mL portion of toluene. The metallocene and MAO/silica were allowed to react for a period of 1 hour at 15° C. The solids were allowed to settle and the supernatant was removed via cannulae. The wet supported catalyst was washed with one 50 mL portion of toluene and again the solids were allowed to settle and the supernatant was removed via cannulae. The wet supported catalyst was then washed sequentially with 3, 50 mL portions of hexane at 0° C. Following the third decantation of the hexane, the wet catalyst slurry was diluted with 45 g of mineral oil. The miPP supported catalyst was isolated as an 8.2% solids slurry.

EXAMPLE 2:

Preparation of miPP Catalyst 4 g of MAO on P-10 silica was added to a 100 mL round-bottomed flask with 30 mLs of toluene and the flask was cooled to 0° C. Rac-Me$_2$Si(2-Me-4,5-BzInd)$_2$ZrCl$_2$ (60 mg) was slurried into 10 mLs of toluene in a 20 mL Wheaton vial. The metallocene slurry was added to a stirred solution of the MAO on silica. The transfer of metallocene was completed with a second 10 mL portion of toluene. The metallocene and MAO/silica were allowed to react for a period of 1 hour at 0° C. The solids were allowed to settle and the supernatant was removed via cannulae. The wet supported catalyst was washed sequentially with 3, 50 mL portions of hexane. Following the third decantation of the hexane, the wet catalyst slurry was diluted with 45 g of mineral oil. The miPP supported catalyst was isolated as a 7.0% solids slurry.

EXAMPLE 3

Preparation of miPP Catalyst 4.8 g of MAO on P-10 silica was added to a 100 mL round-bottomed flask with 30 mLs of toluene and the flask was cooled to 0° C. Rac-Me$_2$Si(2-MeInd)$_2$ZrCl$_2$ (71 mg) was slurried into 10 mLs of toluene in a 20 mL Wheaton vial. The metallocene slurry was added to a stirred solution of the MAO on silica. The transfer of metallocene was completed with a second 10 mL portion of toluene. The metallocene and MAO/silica were allowed to react for a period of 1 hour at 0° C. The solids were allowed to settle and the supernatant was removed via cannulae. The wet supported catalyst was washed with one 50 mL portion of toluene and again the solids were allowed to settle and the supernatant was removed via cannulae. The wet supported catalyst was washed sequentially with 3, 50 mL portions of hexane at 0° C. Following the third decantation of the hexane, the wet catalyst slurry was diluted with 45 g of mineral oil. The miPP supported catalyst was isolated as a 7.5% solids slurry.

EXAMPLE 4

Preparation of sPP Catalyst 5 g of MAO on P-10 silica was added to a 100 mL round-bottomed flask with 50 mLs of toluene. Diphenyl methylene(cyclopentadienyl)(fluorenyl)zirconium dichloride (80 mg) and isopropylidene-(cyclopentadienyl)(2,7-bis-tert-butylfluorenyl)zirconium dichloride (20 mg) was slurried into 10 mL of toluene in a 20 mL Wheaton vial. The metallocene slurry was added to a stirred solution of the MAO on silica. The metallocene and MAO/silica were allowed to react for a period of 1 hour. The solids were allowed to settle and the supernatant was removed via filtration through a sintered glass frit. The wet supported catalyst was washed with one 50 mL portion of toluene followed by 3, 50 mL portions of hexane (sequentially) at 0° C. while on the glass frit. Following the third filtration of the hexane, the wet catalyst slurry was dried under vacuum for 2 hours then diluted with 43 g of mineral oil. The sPP supported catalyst was isolated as a 9.5% solids slurry.

Comparative Example 1

Preparation of miPP Catalyst 5 g of MAO on P-10 silica was added to a 200 mL round-bottomed flask with 100 mLs of toluene and the flask was cooled to 0° C. Rac-Me$_2$Si(2-MeInd)$_2$ZrCl$_2$ (100 mg) was added to a stirred solution of the MAO on silica. The metallocene and MAO/silica were allowed to react for a period of 1 hour at 0° C. The solids were allowed to settle and the supernatant was removed via cannulae. The wet supported catalyst was washed sequentially with three, 100 mL portions of hexane and again the solids were allowed to settle and the supernatant was removed via cannulae. The wet supported catalyst was washed sequentially with 10, 100 mL portions of toluene followed by an additional three washes using 100 mLs of hexane. The catalyst was then vacuum dried for 30 minutes.

Comparative Example 2

Preparation of sPP Catalyst 5 g of MAO on P-10 silica was added to a 500 mL round-bottomed flask with 50 mLs of toluene and the flask cooled to 0° C. Diphenyl methylene(cyclopentadienyl)(fluorenyl)zirconium dichloride (100 mg) was slurried into toluene. The metallocene slurry was added to the stirred solution of the MAO on silica. The metallocene and MAO/silica were allowed to react for a period of 1 hour. The solids were allowed to settle and the supernatant was removed via cannula. The wet supported catalyst was washed sequentially with three 50–100 mL portion of hexane. Following the third filtration of the hexane, the wet catalyst slurry was dried under vacuum for 1 hour.

Polymerization results are summarized in Table 1. The modified procedure described herein results in a substantial increase in catalyst activity (see Example 1 and Comparative Example 1).

TABLE 1

Polymerization Results of Inventive Catalysts Compared to Standard Method

| Catalyst | Prep Method | Activity (g/g/hr) | BD (g/cc) | MF (g/10 min) | XS (%) | $T_m$ (° C.) | $M_W$ /1000 | D ($M_W/M_n$) |
|---|---|---|---|---|---|---|---|---|
| Example 1 | Modified | 11,200 | 0.46 | 1.4 | 0.4 | 150.1 | 431 | 2.8 |
| Example 2 | Modified | 11,700 | 0.46 | 25 | 1.0 | 145.5 | 152 | 2.6 |
| Example 3 | Modified | 20,000 | 0.48 | 49 | — | — | — | — |
| Example 4 | Modified | 13,500 | 0.45 | 4.9 | 4.3 | 129.7 | 141 | 5.2 |
| Comparative Example 1 | Standard | 5,000 | 0.46 | 8.1 | 1.0 | 151.2 | 230 | 3.0 |
| Comparative Example 2 | Standard | 4,000 | 0.30 | 1.4 | 3.1 | 129.6 | 188 | 2.5 |

Catalyst shelf-life was also surprisingly improved using the inventive procedure. For instance, in FIG. 7 described below, the activity of two catalysts were measured under standard miPP conditions. The results indicate that the dried catalysts are much more prone to catalyst deactivation leading to reductions in catalyst activity and that those catalysts produced using the inventive procedure exhibited far superior shelf-life with high activities observed for durations much longer than the standard dried catalyst procedures.

Figure 7:
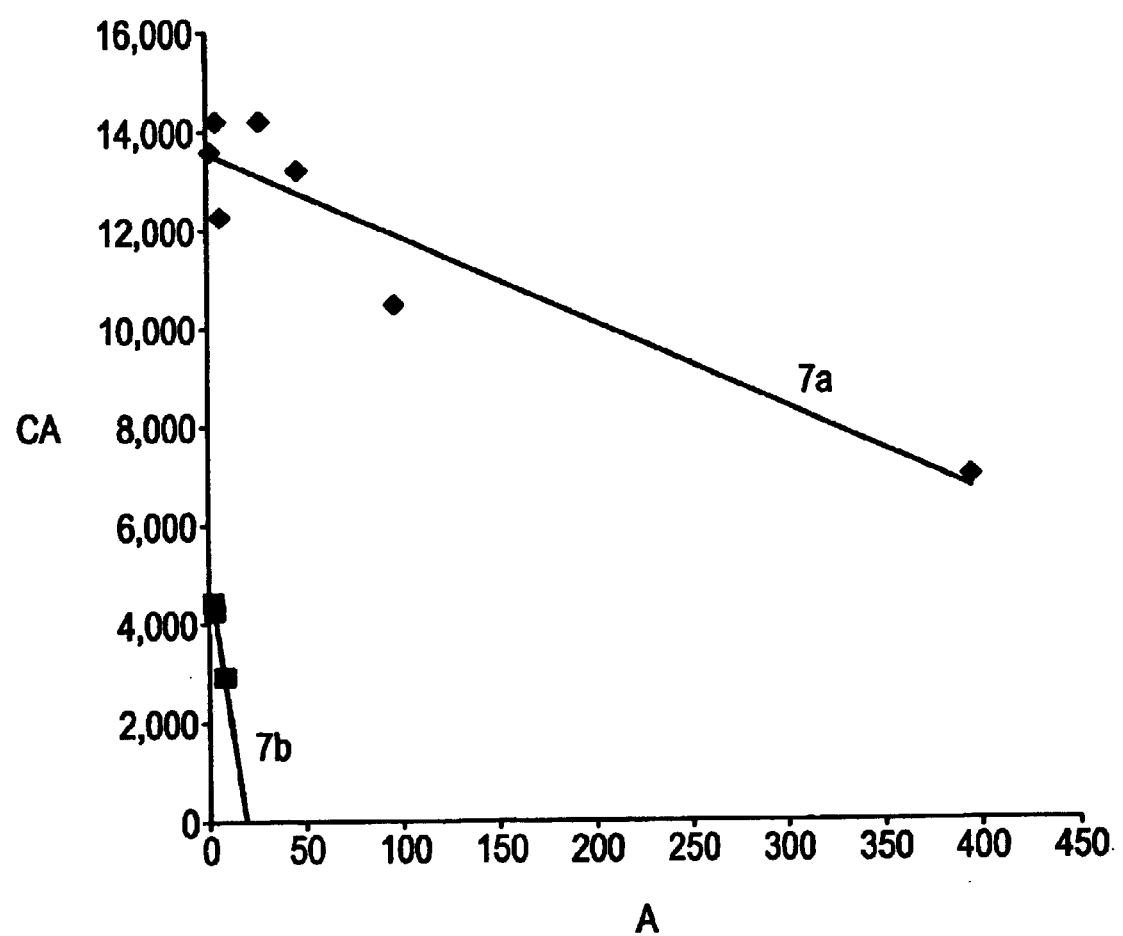
FIG. 7 is a graphical representation showing the relationship between catalyst activity and the age of catalysts.

FIG. 7 illustrates the catalyst activity (CA) in grams per gram per hour plotted on the ordinate versus the age of the catalyst (A) in days plotted on the abscissa for the isospecific metallocene catalyst formulated in accordance with the present invention (♦ data points) and in accordance with the standard prior art procedure (■ data points). As indicated by Curve 7a for the catalyst supported in accordance with the present invention, the catalyst activity declined only moderately over aging times up to 400 days. Curve 7a indicates a vast improvement over the rapid decline in catalyst activity indicated by the conventional supporting procedure as indicated by Curve 7b.

Having described specific embodiments of the present invention, it will be understood that modifications thereof may be suggested to those skilled in the art, and it is intended to cover all such modifications as fall within the scope of the appended claims.

What is claimed:

1. A process for the preparation of a supported metallocene catalyst comprising:

(a) providing a particulate catalyst support material comprising silica particles impregnated with an alumoxane co-catalyst with at least one-half of said co-catalyst disposed within the internal pore volume of said silica particles;

(b) providing a dispersion in an aromatic hydrocarbon solvent of a stereospecific metallocene incorporating a metallocene ligand structure having two sterically dissimilar cyclopentadienyl ring structures coordinated with a central transition metal atom; at least one of said cyclopentadienyl ring structures being a substituted cyclopentadienyl group which provides an orientation with respect to said transition metal atom which is sterically different from the orientation of the other cyclopentadienyl group with respect to said transition metal atom, and both of said cyclopentadienyl groups being in a relationship with each other providing a stereorigid relationship relative to said coordinating transition metal atom to prevent rotation of said ring structures;

(c) mixing said metallocene-solvent dispersion and said alumoxane-impregnated silica particles at a temperature of about 10° C. or less for a period sufficient to enable said metallocene to become reactively supported on and impregnated within said alumoxane-impregnated silica particles and form a silica-supported catalyst;

(d) recovering said supported catalyst from said aromatic solvent;

(e) washing said supported catalyst with a paraffinic hydrocarbon solvent at a temperature of about 10° C. or less; and (f) dispersing said washed catalyst in a viscous mineral oil having a viscosity greater than the viscosity of said paraffinic hydrocarbon solvent.

2. The process of claim 1 wherein the washed catalyst at the time of dispersion in said viscous mineral oil contains a residual amount of said paraffinic hydrocarbon solvent.

3. The process of claim 2 wherein the washing of said supported catalyst with said paraffinic hydrocarbon solvent is effective to reduce the residual aromatic solvent on said supported catalyst to a value of no more than 50 wt. % of said supported catalyst.

4. The process of claim 1 wherein said viscous mineral oil has a viscosity of at least 10 centistokes.

5. The process of claim 4 wherein said paraffinic hydrocarbon solvent has a viscosity of no more than 2 centistokes.

6. The process of claim 1 wherein subsequent to step (d) and prior to step (e) washing the recovered supported metallocene catalyst with an aromatic solvent to remove unsupported metallocene from said supported metallocene catalyst and thereafter washing said supported catalyst in accordance with step (e).

7. The process of claim 1 wherein said silica support material comprises spheroidal silica particles having an average particle size within the range of 20–60 microns.

8. The process of claim 7 wherein said spheroidal silica particles have an average effective pore diameter within the range of 200–400 Angstroms.

9. The process of claim 8 wherein the weight ratio of said alumoxane to said silica in subparagraph (a) of claim 1 is within the range of about 0.6–2.0.

10. The process of claim 1 wherein said stereospecific metallocene is a syndiospecific metallocene characterized by the formula:

$$R''(Cp_aR_n)(Cp_bR'_m)MeQ_p$$

wherein $Cp_a$ is a substituted cyclopentadienyl ring, $Cp_b$ is an unsubstituted or substituted cyclopentadienyl ring; each R is the same or different and is a hydrocarbyl radical having 1–20 carbon atoms; each $R'_m$ is the same or different and is a hydrocarbyl radical having 1–20 carbon atoms; R" is a structural bridge between the cyclopentadienyl rings imparting stereorigidity to the metallocene and is selected from the group consisting of an alkylene radical having 1–4 carbon atoms, a silicon hydrocarbyl radical, a germanium hydrocarbyl radical, a phosphorus hydrocarbyl radical, a nitrogen hydrocarbyl radical, a boron hydrocarbyl radical, and an aluminum hydrocarbyl radical; Me is a group 4b, 5b, or 6b metal from the Periodic Table of Elements; each Q is a hydrocarbyl radical having 1–20 carbon atoms or is a halogen; $0 \leq p \leq 3$; $0 \leq m \leq 4$; $1 \leq n \leq 4$; and wherein $R'_m$ is selected such that $(Cp_bR'_m)$ is a sterically different ring than $(Cp_aR_n)$.

11. The process of claim 10 wherein R is selected such that $(Cp_aR_n)$ forms a substituted or unsubstituted fluorenyl group.

12. The process of claim 11 wherein Me is titanium, zirconium, hafnium, or vanadium.

13. The process of claim 12 wherein R" is a methylene, ethylene, organosilyl, substituted methylene, or substituted ethylene radical.

14. The process of claim 13 wherein R is selected such that $(Cp_aR_n)$ forms a substituted or unsubstituted fluorenyl radical having bilateral symmetry and R' is selected such that $(Cp_bR'_m)$ forms an alkyl substituted or unsubstituted cyclopentadienyl radical having bilateral symmetry.

15. The process of claim 14 wherein $R''(Cp_aR_n)(Cp_bR'_m)$ forms an isopropylidene(cyclopentadienyl-1-2,7-di-tert-butyl fluorenyl) ligand or a diphenyl methylene (cyclopentadienyl-1-fluorenyl) ligand.

16. The process of claim 10 wherein said stereospecific metallocene is selected from the group consisting of isopropylidene(cyclopentadienyl-1-2,7-di-tert-butyl fluorenyl) zirconium dichloride and diphenyl methylene (cyclopentadienyl-1-fluorenyl) zirconium dichloride and mixtures thereof.

17. The process of claim 1 wherein said stereospecific metallocene is an isospecific metallocene characterized by the formula:

$$R''(C_5(R')_4)_2MeQ_p$$

wherein each $(C_5(R')_4)$ is a substituted cyclopentadienyl ring; each R' is the same or different and is a hydrogen or hydrocarbyl radical having 1–20 carbon atoms; R" is a structural bridge between the two $(C_5(R')_4)$ rings imparting stereorigidity to said metallocene with the two $(C_5(R')_4)$ rings being in a racemic configuration relative to Me, and R" is selected from the group consisting of an alkylene radical having 1–4 carbon atoms, a silicon hydrocarbyl radical, a germanium hydrocarbyl radical, a phosphorus hydrocarbyl radical, a nitrogen hydrocarbyl radical, a boron hydrocarbyl radical, and an aluminum hydrocarbyl radical; Me is a group 4b, 5b, or 6b metal as designated in the Periodic Table of Elements; each Q is a hydrocarbyl radical having 1–20 carbon atoms or is a halogen; and $0 \leq p \leq 3$.

18. The process of claim 17 wherein said $(C_5(R')_4)$ groups are indenyl groups which are substituted or unsubstituted.

19. The process of claim 18 wherein said indenyl groups are each substituted at the proximal position.

20. The process of claim 18 wherein Me is titanium, zirconium, hafnium, or vanadium.

21. The process of claim 20 wherein R" is a methylene, ethylene, organosilyl, substituted methylene, or substituted ethylene radical.

22. The process of claim 21 wherein said isospecific metallocene is selected from the group consisting of racemic dimethylsilyl(2-methyl-4-phenyl indenyl)$_2$ zirconium dichloride, racemic dimethylsilyl(2-methyl-4-indenyl)$_2$ zirconium dichloride, and racemic dimethylsilyl(2-methyl-4,5-benzo indenyl)$_2$ zirconium dichloride and admixture thereof.

23. A process for the preparation of a supported metallocene catalyst comprising:

(a) providing a particulate catalyst support material comprising spheroidal silica particles having an average particle size within the range of 20–60 microns and an average effective pore diameter within the range of 200–400 Angstroms;

(b) contacting said particulate support material with an alumoxane co-catalyst in an aromatic carrier liquid;

(c) heating said mixture of support, carrier liquid, and alumoxane co-catalyst at an elevated temperature for a period sufficient to fix said alumoxane on said particulate support material with at least one-half of said co-catalyst disposed within the internal pore volume of said silica particles;

(d) cooling said mixture and separating said alumoxane-containing support material from said carrier liquid;

(e) washing said alumoxane containing support material with an aromatic solvent to remove excess alumoxane therefrom;

(f) cooling said alumoxane containing support material to a reduced temperature of about 10° C. or less and at said reduced temperature adding to said support material a dispersion in an aromatic hydrocarbon solvent of a stereospecific metallocene incorporating a metallocene ligand structure having two sterically dissimilar cyclopentadienyl ring structures coordinated with a central transition metal atom; at least one of said cyclopentadienyl ring structures being a substituted cyclopentadienyl group which provides an orientation with respect to said transition metal atom which is sterically different from the orientation of the other cyclopentadienyl group with respect to said transition metal atom, and both of said cyclopentadienyl groups being in a relationship with each other providing a stereorigid relationship relative to said coordinating transition metal atom to prevent rotation of said ring structures;

(g) mixing said metallocene-solvent dispersion and said alumoxane-impregnated silica particles at a temperature of about 10° C. or less for a period sufficient to enable said metallocene to become reactively supported on and impregnated within said alumoxane-impregnated silica particles and form a silica-supported catalyst;

(h) recovering the resulting supported metallocene catalyst from said aromatic solvent;

(i) washing said supported catalyst with a paraffinic hydrocarbon solvent at a reduced temperature of about 10° C. or less; and (j) thereafter dispersing said supported metallocene in a viscous mineral oil having a viscosity substantially greater than the viscosity of said paraffinic hydrocarbon solvent.

24. The process of claim 23 wherein subsequent to step (h) and prior to step (i) washing the recovered supported metallocene catalyst with an aromatic solvent to remove unsupported metallocene from said supported metallocene catalyst and thereafter washing said supported catalyst in accordance with step (i).

25. The process of claim 23 wherein the weight ratio of said alumoxane to said silica is within the range of about 0.6–2.0.

26. The process of claim 23 wherein said stereospecific metallocene is a syndiospecific metallocene characterized by the formula:

$$R''(Gp_aR_n)(Cp_bR'_m)MeQ_p$$

wherein $Cp_a$ is a substituted cyclopentadienyl ring, $Cp_b$ is an unsubstituted or substituted cyclopentadienyl ring; each R is the same or different and is a hydrocarbyl radical having 1–20 carbon atoms; each $R'_m$ is the same or different and is a hydrocarbyl radical having 1–20 carbon atoms; R'' is a structural bridge between the cyclopentadienyl rings imparting stereorigidity to the catalyst and is selected from the group consisting of an alkylene radical having 1–4 carbon atoms, a silicon hydrocarbyl radical, a germanium hydrocarbyl radical, a phosphorus hydrocarbyl radical, a nitrogen hydrocarbyl radical, a boron hydrocarbyl radical, and an aluminum hydrocarbyl radical; Me is a group 4b, 5b, or 6b metal from the Periodic Table of Elements; each Q is a hydrocarbyl radical having 1–20 carbon atoms or is a halogen; $0 \leq p \leq 3$; $0 \leq m \leq 4$; $1 \leq n \leq 4$; and wherein $R'_m$ is selected such that $(Cp_bR'_m)$ is a sterically different ring than $(Cp_aR_n)$.

27. The process of claim 26 wherein the weight ratio of said alumoxane to said silica is within the range of about 0.6–2.0.

28. The process of claim 27 wherein the concentration of said metallocene on said support is within the range of 0.1–6 wt. %.

29. The process of claim 23 wherein said stereospecific metallocene is a chiral stereorigid metallocene characterized by the formula:

$$R''(C_5(R')_4)_2MeQ_p$$

wherein each $(C_5(R')_4)$ is a substituted cyclopentadienyl ring; each R' is the same or different and is a hydrogen or hydrocarbyl radical having 1–20 carbon atoms; R'' is a structural bridge between the two $(C_5(R')_4)$ rings imparting stereorigidity to said catalyst with the two $(C_5(R')_4)$ rings being in a racemic configuration relative to Me, and RM is selected from the group consisting of an alkylene radical having 1–4 carbon atoms, a silicon hydrocarbyl radical, a germanium hydrocarbyl radical, a phosphorus hydrocarbyl radical, a nitrogen hydrocarbyl radical, a boron hydrocarbyl radical, and an aluminum hydrocarbyl radical; Me is a group 4b, 5b, or 6b metal as designated in the Periodic Table of Elements; each Q is a hydrocarbyl radical having 1–20 carbon atoms or is a halogen; and $0 \leq p \leq 3 \leq$.

30. The process of claim 29 wherein the weight ratio of said alumoxane to said particulate silica support is within the range of about 0.6–2.0.

31. The process of claim 30 wherein the concentration of said metallocene on said support is within the range of 0.1–6.0 wt. %.

* * * * *